Figure 1:
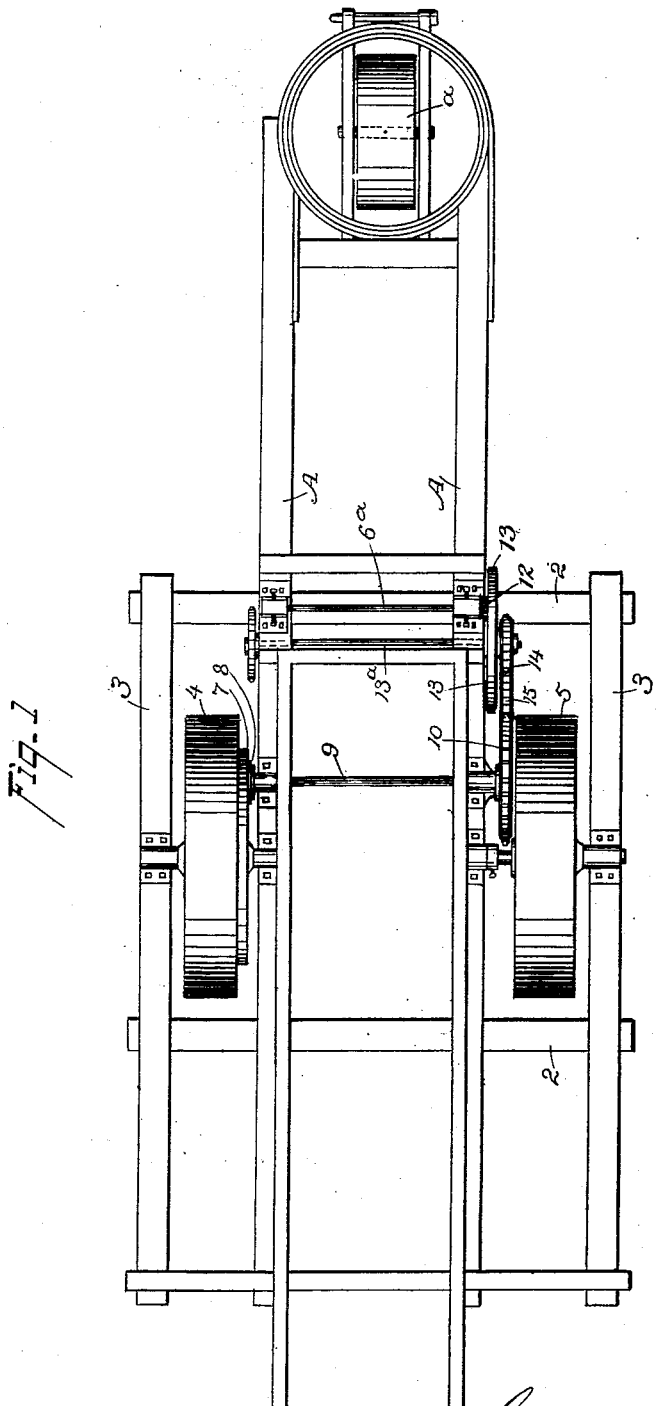

No. 703,061. Patented June 24, 1902.
G. W. HAINES.
THRESHING MACHINE.
(Application filed Jan. 12, 1901.)
(No Model.) 3 Sheets—Sheet 1.

Witnesses:
Inventor,
George W. Haines
By Dewey Strong & Co.
Attys

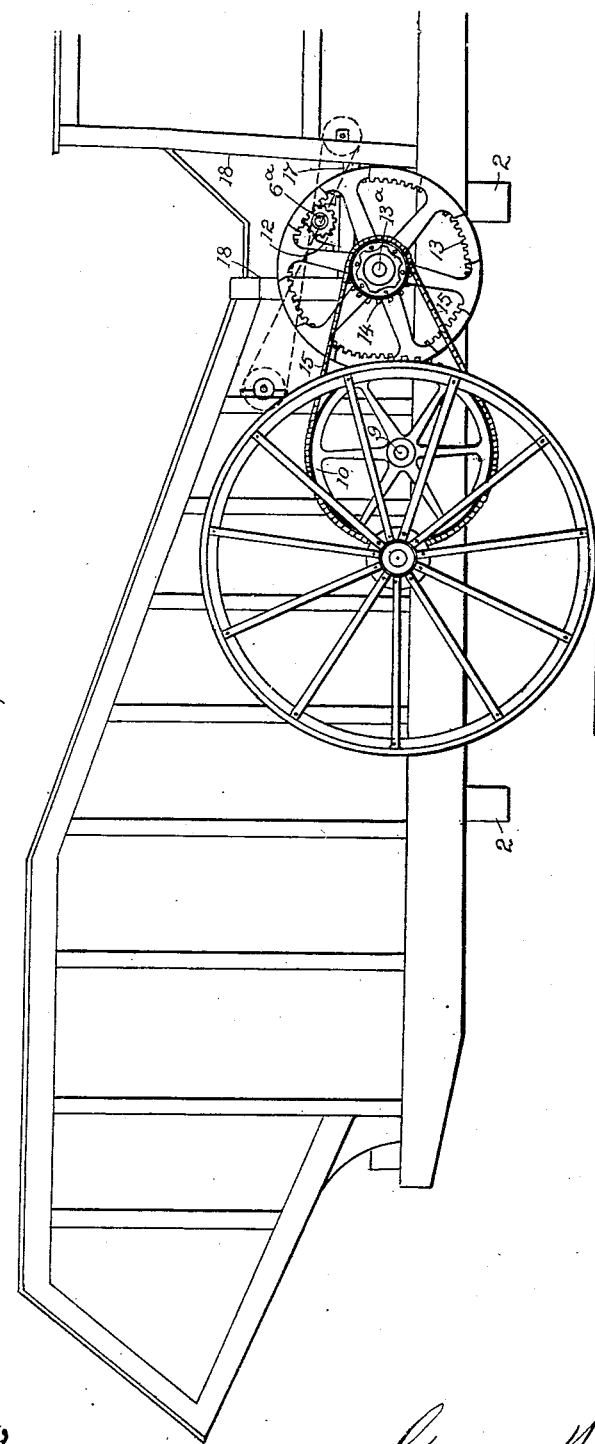

No. 703,061. Patented June 24, 1902.
G. W. HAINES.
THRESHING MACHINE.
(Application filed Jan. 12, 1901.)
(No Model.) 3 Sheets—Sheet 3.
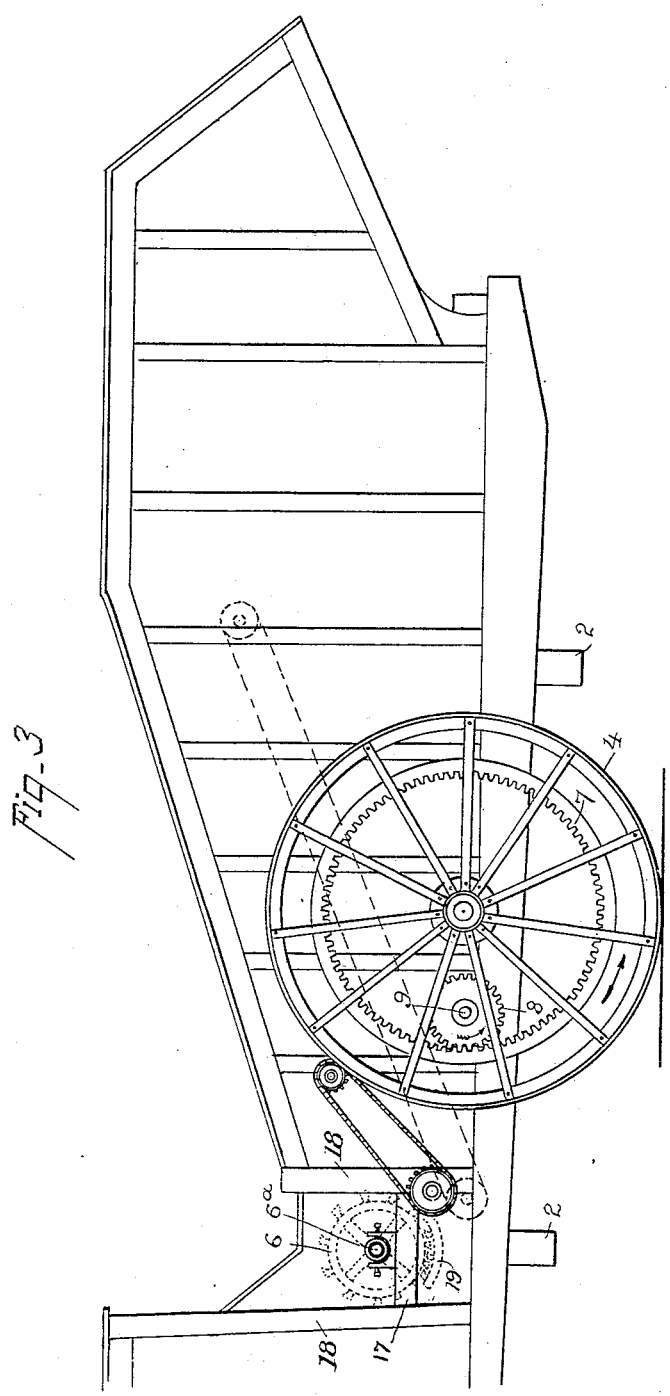

UNITED STATES PATENT OFFICE.

GEORGE W. HAINES, OF STOCKTON, CALIFORNIA, ASSIGNOR TO HOUSER & HAINES MANUFACTURING COMPANY, OF STOCKTON, CALIFORNIA, A CORPORATION OF CALIFORNIA.

THRESHING-MACHINE.

SPECIFICATION forming part of Letters Patent No. 703,061, dated June 24, 1902.

Application filed January 12, 1901. Serial No. 42,996. (No model.)

*To all whom it may concern:*

Be it known that I, GEORGE W. HAINES, a citizen of the United States, residing at Stockton, county of San Joaquin, State of California, have invented an Improvement in Threshing-Machines; and I hereby declare the following to be a full, clear, and exact description of the same.

My invention relates to improvements in that class of machines known as "combined harvesters," in which a threshing-machine is mounted upon bearing and steering wheels and has a header attachment projecting from one side by which the grain is cut, means for transmitting the grain and delivering it to a feed mechanism upon the thresher which in turn supplies the threshing-cylinder, and means in the rear of said cylinder for transporting and separating the straw, grain, and chaff, this mechanism all being driven by power derived from the rotation of the bearing-wheels of the threshing-machine as it travels over the ground.

My invention consists of the parts and the constructions and combinations of parts, which I will hereinafter describe and claim.

Referring to the accompanying drawings, Figure 1 is a plan view of the main framework of the threshing-machine, showing the bearing-wheels and means for transmitting power therefrom to the cylinder. Fig. 2 is an elevation of the threshing-machine, taken from the side adjacent to the header and showing the side rail omitted. Fig. 3 is an elevation of same, showing the left side with the side rail omitted.

Various mechanisms have been employed since this class of machinery has been in use for transmitting power to drive the various portions of the apparatus. The difficulty in properly operating this mechanism arises from the fact that while the machine rarely travels over the ground at a greater speed than two to two and one-half miles per hour it is necessary to provide an intermediate mechanism, so that the threshing-cylinder should revolve about nine hundred or more revolutions per minute for the purpose of thoroughly threshing the grain which is continually brought to it and to prevent the machine from being clogged.

When gearing is employed to transmit the motion, a difficulty arises from the fact that the rate of travel of the machine may vary in light or heavy grain or by reason of irregularities of the ground-surface, and this variation of travel will either constantly check the movements or increase their rapidity. A threshing-cylinder weighs from three hundred and fifty pounds upward, and when such a cylinder is revolving at the rate of eight or nine hundred revolutions per minute any check in the speed of revolution will be transmitted immediately to the gearing intermediate between it and the slow-moving main bearing-wheels, and the momentum of the cylinder is therefore liable to and does exert such a strain upon the teeth of the gearing as to break them and cause great damage and loss of time to take out the broken gear and replace it with a new one. Upon the other hand, when such machinery is drawn by teams of horses, of which from twenty-four to thirty are usually employed, in addition to the slowing down previously referred to, it often occurs that teams become frightened and start to run away. In this case the more rapid movement causes an increased speed of rotation of the bearing-wheels, and this cannot be transmitted at once to the cylinder on account of its inertia, and this again will break the teeth of the gears. In order to overcome this particular difficulty, sprocket-wheels and chains have been largely substituted for the close-toothed gearing, the chains breaking under unusual strain, so that the machinery will not be injured by the changes of movement, and as the links of the chain are easily replaced the expense and loss of time by the breaking of the chain is comparatively little. There are certain objections, however, to the use of a long series of chains and sprocket-wheels, which are necessary to increase the speed of the slow-moving bearing-wheels to a sufficient amount to drive the cylinder at the proper speed.

It is the object of my invention to combine the gear and chain driving in such a manner that I obtain the advantage due to the gears without danger of breaking them and the value of the chain as an intermediary to prevent damage to the machinery in case of changes of speed, as above described, and, further, to transmit the motion of the main driver directly to the cylinder which, with all intermediate wheels, turn in one direction without any reverse rotation of any wheel or part.

The cylinder and driving shafts of the gearing are all journaled in close proximity upon the solid frame-timbers to avoid the effect upon them of torsion of the frame and to keep the gears in proper mesh.

As shown in the drawings, A A are the longitudinal sills of a threshing-machine, and 2 represents the transverse timbers of the wheel-frames, having the exterior timbers 3, which form an inclosure, within which the wheels 4 and 5 are journaled. These wheels are of any suitable diameter. They are usually made from five and one-half to six feet in diameter and have projecting ribs, termed "grousers," upon the periphery to prevent their slipping and give a sufficient hold upon the ground to transmit the necessary power to drive the machinery. The front of the machine is supported upon the usual swiveled turnable steering-wheel a.

Power to operate the header and the draper or carrying-belt, which transmits the cut grain to the threshing-machine, is usually derived from the wheel 5 upon the right or grain side of the machine, and power to drive the threshing-cylinder is derived from the wheel 4 upon the opposite or left side of the machine. The grain-carrier and back-beater are driven from the wheel 5 by intermediate connections. This double driving produces a counterbalance of the forces of the machine due to the power necessarily transmitted and the side draft of the cutting mechanism which projects so far from the right side of the machine.

In order to properly transmit the power from the wheel 4 to the threshing-cylinder, which is indicated at 6, it is desirable to first transmit the power from the left to the right side of the machine and in such a manner as not to interfere with the carrying-belts, fan, shaking, cleaning-shoes, and various mechanism with which the interior of the threshing-machine is pretty thoroughly equipped. The first transmission of motion and power from the bearing-wheel 4 takes place by means of a gear 7, which is carried by this wheel. This gear is an internal gear fixed to the spokes of the wheel at a sufficient distance inside of the rim to prevent these teeth being clogged by dirt, stones, or other material which might be picked up from the ground, and the teeth of this wheel engage the teeth of a pinion 8, which is mounted upon a shaft 9. I prefer to make the gear 7 with internal teeth, so that the motion of the gear 7 is transmitted to turn the pinion 8 and shaft 9 in the same direction, and I thus avoid a second counter-shaft and gearing, which would otherwise become necessary to obtain motion in the proper direction to drive the cylinder.

The shaft 9 is suitably journaled with relation to the sills A and the interior mechanism of the threshing-machine, so that it passes across from the left to the right side of the machine. Its journal-boxes may be fixed either directly upon the sills or upon timbers carried upon the sills, the position being such that the shaft will pass through the machine without interfering with the grain-belt or other parts located at this point. By means of adjustable boxes of any suitable or well-known description the position of the shaft may be regulated so that the meshing of the gear 7 and pinion 8 will be proportionately maintained, and as the shafts of both wheels are carried upon the main-frame timbers and near each other the gears are not liable to be thrown out of proper mesh. Upon the opposite end of the shaft 9 is a large sprocket-wheel 10. This sprocket-wheel turns closely to the side of the machine and is of larger diameter and revolves in the space between the sills A and the bearing-wheel 5 on the right side of the machine.

The shaft $6^a$ of the threshing-cylinder has upon the right end a pinion 12, and this pinion is engaged by an internal gear 13, the shaft $13^a$ of which is journaled in suitable brackets or supports upon the framework of the machine at this side and so mortised together that the two shafts are practically mounted upon a single solid structure. Upon the shaft of this wheel 13 I have shown a sprocket-wheel 14, which is in line with the sprocket-wheel 10 previously described and is removably bolted to the spokes of wheel 13. This allows it to be removed, and the gear 13 can also be removed for easy access to the interior without disturbing other parts, and there are no exterior timbers to prevent this operation. A chain 15 passes around these two sprockets, and thus power is transmitted between the two to drive the cylinder. By this construction I am enabled to employ the gears and pinions 7 and 8 for the first transmission of power and motion from the bearing-wheel 4 and to employ the pinion and gear 12 and 13 for the last transmission to the cylinder, while the intermediate chain 15 provides for the relief or safety against breakage from sudden changes of motion, and at the same time it provides a certain yielding on account of the slackness of the chain, which is necessary for the relief of the parts when the machine first starts and before the speed of the cylinder has reached its maximum.

It will be understood that in the place of the sprocket-wheels and chain a belt of any description may be employed, the operation being essentially the same, and the relief will be obtained in this case by the slipping of the belt in case the speed of one part increases unduly.

The gearing which I have here described, commencing with an internally-toothed gear 7, ends with the internally-toothed gear 13 and the externally-toothed pinion 12 upon the cylinder-shaft, and I am thus enabled to reduce the number of shafts and wheels to the least possible number, reducing friction and avoiding all reverse movements of intermediate parts. I also prefer to use the internal gear to transmit motion to the cylinder, because the pressure of its teeth against those of the pinion 12 acts to counteract the tendency of the mass of straw passing between the concave and the cylinder to lift the cylinder in its bearings. By reason of the number of teeth engaged on account of the pinion being inside the gear two or more teeth are always in engagement, and there is less danger of breakage under the varying strains.

The gear-wheel 13 is keyed to its shaft and is exterior to the frame-timbers, so that it is easily removable.

The sprocket-wheel 14 is bolted to the spokes of the wheel 13 and is thus independently removable after taking off the chain.

The cylinder-shaft journal-boxes are supported upon the transverse timbers or brackets 17, which are strongly fixed to the uprights 18 but a short distance above the main-frame timbers A, forming a strong integral support for the cylinder-shaft and the shaft 13ᵃ of the internal gear, the boxes of which are also supported upon the same structure.

Beneath the cylinder is the concave 19, having teeth which act with those of the cylinder to thresh out the grain, and I have so located the shaft 13ᵃ that it extends entirely across the machine beneath the concave, which allows the bearing-boxes to be separated the width of the machine instead of having a support exterior to the gear 13 and a short shaft between it and the main frame.

Having thus described my invention, what I claim as new, and desire to secure by Letters Patent, is—

1. The combination of the bearing-wheels, the threshing-cylinder, and mechanism intermediate of the two whereby motion is transmitted from the bearing-wheel to the cylinder, said mechanism including a gear-wheel fixed to one of the bearing-wheels, a shaft extending across the machine, having a pinion upon one end to engage said gear-wheel and having a wheel upon the opposite end; a second shaft extending across the machine, having an internal-gear wheel on the same side of the machine as the last-named wheel, and a wheel fixed to the face of said internal-gear wheel, a belt connection between the wheel of the first-named shaft and the last-named wheel, and a cylinder-shaft having a pinion to engage the internal gear.

2. The combination of the bearing-wheels, the threshing-cylinder, and mechanism intermediate of the two whereby motion is transmitted from the left bearing-wheel to the cylinder, said mechanism including a shaft extending across the machine having a pinion on the left end and a sprocket-wheel on the right end said pinion engaging a gear-wheel fixed to the left bearing-wheel, a second shaft extending across the machine having an internal-gear wheel on its right-hand end and a sprocket-pinion removably bolted to the face of said gear-wheel, a breakable chain connecting the sprocket wheel and pinion, and a cylinder-shaft having a pinion engaging the teeth of the internal-gear wheel.

3. In a traveling thresher, a threshing-machine, bearing-wheels therefor, a threshing-cylinder journaled upon the frame, a mechanism for transmitting motion and speed from the left bearing-wheel to the cylinder, consisting of an internal gear fixed to and carried by the left bearing-wheel, an externally-toothed pinion meshing therewith and mounted upon a shaft journaled upon the main-frame timbers of the machine, a sprocket-wheel fixed to the opposite end of said shaft and lying between the right-hand bearing-wheel and the frame-timbers on that side, a pinion fixed to the right end of the cylinder-shaft, an internal gear, the teeth of which engage therewith, said gear mounted upon a shaft which is journaled upon and extends across the same structure with the cylinder-shaft, a sprocket-pinion detachably fixed to the internal gear and a chain connecting the sprocket wheel and pinion.

In witness whereof I have hereunto set my hand.

GEORGE W. HAINES.

Witnesses:
S. H. NOURSE,
CHAS. E. TOWNSEND.